(12) United States Patent
Kaneko et al.

(10) Patent No.: US 9,329,902 B2
(45) Date of Patent: May 3, 2016

(54) INFORMATION PROCESSING METHOD OF CONTROLLING VARIATION IN A NUMBER OF PROCESSES, STORAGE MEDIUM, AND INFORMATION PROCESSING DEVICE

(71) Applicant: FUJITSU LIMITED, Kawasaki-shi, Kanagawa (JP)

(72) Inventors: Yohei Kaneko, Kawasaki (JP); Tomohiro Kawasaki, Yokohama (JP); Naoki Yamano, Yokohama (JP); Atsushi Shimano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 360 days.

(21) Appl. No.: 13/937,934

(22) Filed: Jul. 9, 2013

(65) Prior Publication Data
US 2014/0068628 A1     Mar. 6, 2014

(30) Foreign Application Priority Data

Sep. 5, 2012   (JP) ................. 2012-194694

(51) Int. Cl.
*G06F 9/50*     (2006.01)
*G06F 9/48*     (2006.01)

(52) U.S. Cl.
CPC .............. *G06F 9/505* (2013.01); *G06F 9/485* (2013.01); *G06F 9/5083* (2013.01); *G06F 9/50* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 6,182,109 B1 | 1/2001 | Sharma et al. | |
| 2013/0132970 A1 | 5/2013 | Miyoshi | |
| 2013/0179894 A1* | 7/2013 | Calder ................. | G06F 9/5027 718/104 |
| 2013/0179895 A1* | 7/2013 | Calder ................. | G06F 9/5077 718/104 |

FOREIGN PATENT DOCUMENTS

| | | |
|---|---|---|
| JP | 7-302242 | 11/1995 |
| JP | 9-265409 | 10/1997 |
| JP | 2006-317991 | 11/2006 |
| WO | 2012/008016 A1 | 1/2012 |

OTHER PUBLICATIONS

Japanese Office Action dated Dec. 22, 2015 in corresponding Japanese Patent Application No. 2012-194694.

* cited by examiner

*Primary Examiner* — Qing Wu
(74) *Attorney, Agent, or Firm* — Staas & Halsey LLP

(57) ABSTRACT

A non-transitory computer-readable recording medium storing a program causing a computer to execute a process, the process includes starting N (two or more) processes from a first program; and controlling variation in the number of processes for which a second program is deployed, depending on a load on the processes for which the second program is deployed, within a range of the N processes by deploying the second program to a storage area corresponding to one process of the N processes and undeploying the second program deployed to the storage area.

12 Claims, 15 Drawing Sheets

FIG. 8

| APPLICATION | MINIMUM NUMBER OF PROCESSES | THRESHOLD FOR CHANGES | NUMBER OF PROCESSES TO BE CHANGED |
|---|---|---|---|
| BUSINESS APPLICATION A | 3 | 2 | 2 |
| BUSINESS APPLICATION B | 3 | 2 | 1 |

FIG. 13

| APPLICATION | MINIMUM NUMBER OF PROCESSES | THRESHOLD FOR CHANGES | PREVIOUS NUMBER OF PROCESSES IN USE |
|---|---|---|---|
| BUSINESS APPLICATION A | 3 | 2 | 6 |
| BUSINESS APPLICATION B | 3 | 2 | 1 |

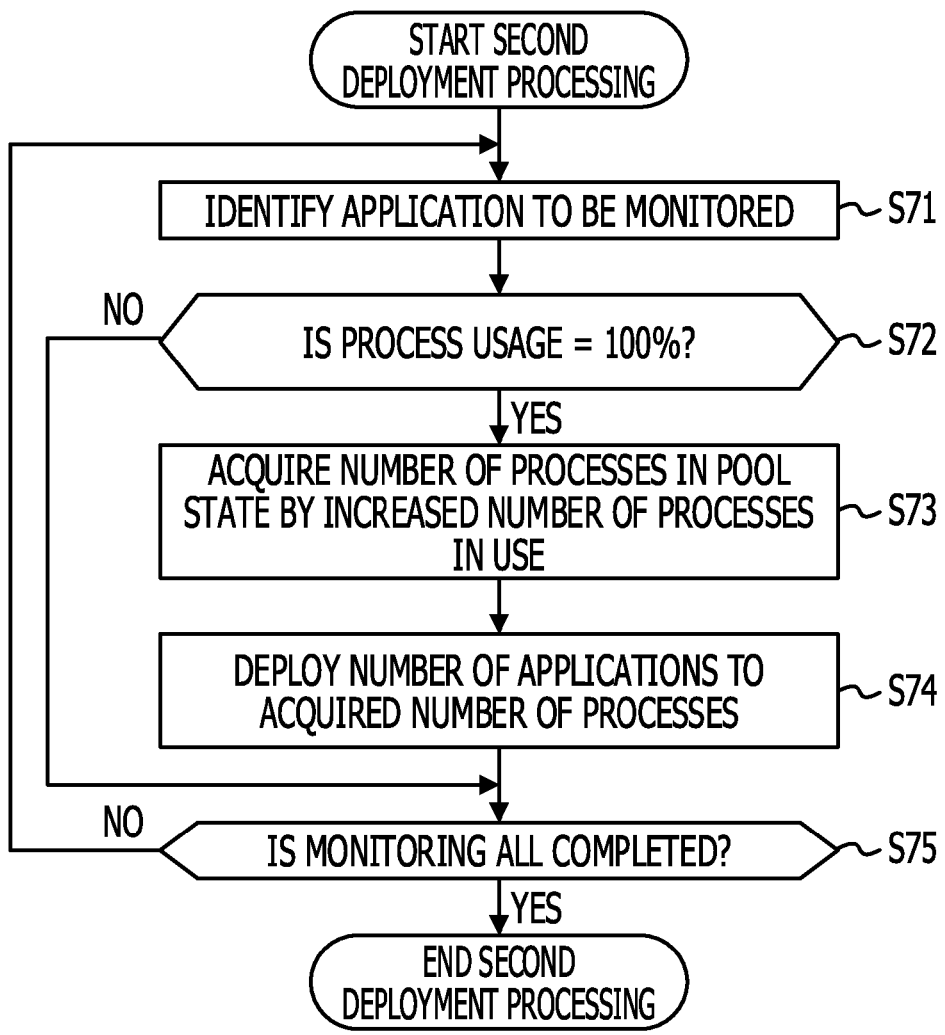

INFORMATION PROCESSING METHOD OF CONTROLLING VARIATION IN A NUMBER OF PROCESSES, STORAGE MEDIUM, AND INFORMATION PROCESSING DEVICE

CROSS-REFERENCE TO RELATED APPLICATION

This application is based upon and claims the benefit of priority of the prior Japanese Patent Application No. 2012-194694, filed on Sep. 5, 2012, the entire contents of which are incorporated herein by reference.

FIELD

The embodiments discussed herein are related to a storage medium, an information processing method, and an information processing device.

BACKGROUND

There is a server system in which when there is a high load level for service requests from a client, the service request is fulfilled by adjusting the number of processes for applications. The server system adjusts the number of processes for applications on the basis of a response time for a service request and the number of service requests estimated in advance per unit of time.

The number of processes for applications may be manually adjusted by a system administrator. A server system capable of monitoring the state of the load due to service requests and automatically adjusting the number of processes has been disclosed. Japanese Laid-open Patent Publication No. 2006-317991 and Japanese Laid-open Patent Publication No. 9-265409 disclose examples of the related art.

The number of processes is desirably adjusted in accordance with the peak load of service requests. It is, however, difficult to appropriately estimate the peak load. The cost of starting and stopping processes is high, and it is difficult to follow sudden changes in load. Therefore, when adjusting the number of processes, resources are still needlessly consumed for much of the time thereof.

SUMMARY

According to an aspect of the invention, a non-transitory computer-readable recording medium storing a program causing a computer to execute a process, the process includes starting N (two or more) processes from a first program; and controlling variation in the number of processes for which a second program is deployed, depending on a load on the processes for which the second program is deployed, within a range of the N processes by deploying the second program to a storage area corresponding to one process of the N processes and undeploying the second program deployed to the storage area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is an example of a setting table in the second embodiment;

FIG. 13 is an example of a setting table of the third embodiment;

FIG. 15 is a flowchart of second deployment processing in the third embodiment.

DESCRIPTION OF EMBODIMENTS

Hereinafter, embodiments will be described in detail with reference to the drawings.

First Embodiment

Figure 1:
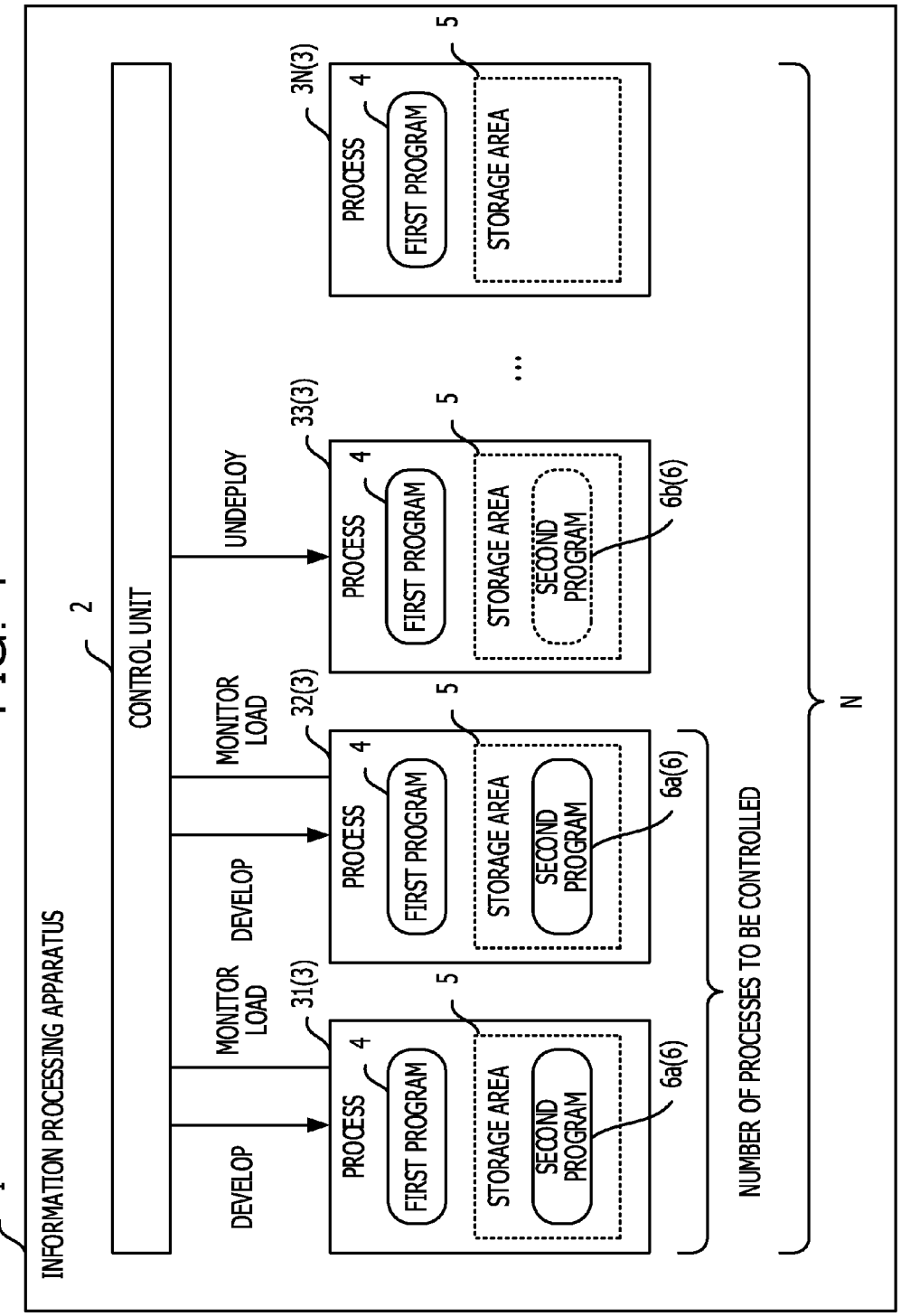
FIG. 1 is a block diagram depicting an example of a configuration of an information processing device in a first embodiment.

An information processing device of a first embodiment will first be described with reference to FIG. 1. FIG. 1 is a block diagram illustrating an example of a configuration of the information processing device in the first embodiment.

The information processing device 1 makes a service response to a service request from a client terminal. The information processing device 1 makes a service response by executing a program suitable for the service. In order to support a plurality of service requests, the information processing device 1 starts a plurality of processes 3, which are units of execution for a program.

The information processing device 1 starts the processes 3 from a first program 4. The first program 4 is a program for starting the processes 3 that form execution bases shared by a plurality of types of programs that support different service requests. For example, the first program 4 performs assignment of resources to be used, mapping of a library to be used, and the like, and then starts the processes 3. In the example illustrated in FIG. 1, the information processing device 1 starts N processes 3 (processes 31, 32, 33, ..., 3N) from the first program 4.

In this way, the information processing device 1 starts a desired number (N, two or more) of processes 3 in advance before accepting a service request. Examples of the desired number include a number set in advance, the number determined depending on the amount of resources available in the information processing device 1. Accordingly, the information processing device 1, by using the first program 4, bears the processing cost for starting before a service request is made from a client terminal.

Upon receiving assignment of storage areas 5 to the processes 3, the processes 3 allow programs (second programs 6) suitable for the service to be deployed to the storage areas 5. For example, the processes 31 and 32 each allow the second program 6a to be deployed to one of the storage areas 5. The processes 3 allow the programs that have been deployed in the storage areas 5 to be undeployed. For example, the process 33 allows the second program 6b that has been deployed in the storage area 5 to be undeployed.

At this point, the information processing device 1 has started the processes 3, which are execution bases shared by a plurality of types of programs. This enables the information processing device 1 to reduce the processing cost for deployment and undeployment of the second programs 6. Accordingly, it is possible for the information processing device 1 to control the number of processes 3 (the number of control target processes) for each of which a corresponding one of the second programs 6 is deployed in a storage area 5, at a low cost.

The information processing device 1 provides a plurality of processes 3 for each of which a corresponding one of the second programs 6 is deployed, thereby setting a number of processes that enables service requests to be concurrently processed. Service requests made from a client terminal per unit of time are not fixed but variable. For this reason, the information processing device 1 dynamically controls the number of processes 3 for each of which a corresponding one of the second programs 6 is deployed.

The information processing device 1 monitors the loads on the processes 3 for each of which a corresponding one of the second programs 6 is deployed, and controls an increase or decrease in the number of processes 3 depending on the load amounts. The number of control target processes is controllable up to a range of N, which is the number of the processes 3 started in advance. For example, the information processing device 1 may detect the loads borne by the processes 3, for each of which a corresponding one of the second programs 6 is deployed, depending on the number or proportion of the processes 3 executing of processing related to service requests, among the processes 3 for each of which a corresponding one of the second programs 6 is deployed.

Accordingly, the information processing device 1 may improve the followability of number control with respect to changes in the loads on the processes 3, and additionally may promote effective use of resources by lessening the loads.

Second Embodiment

Figure 2:
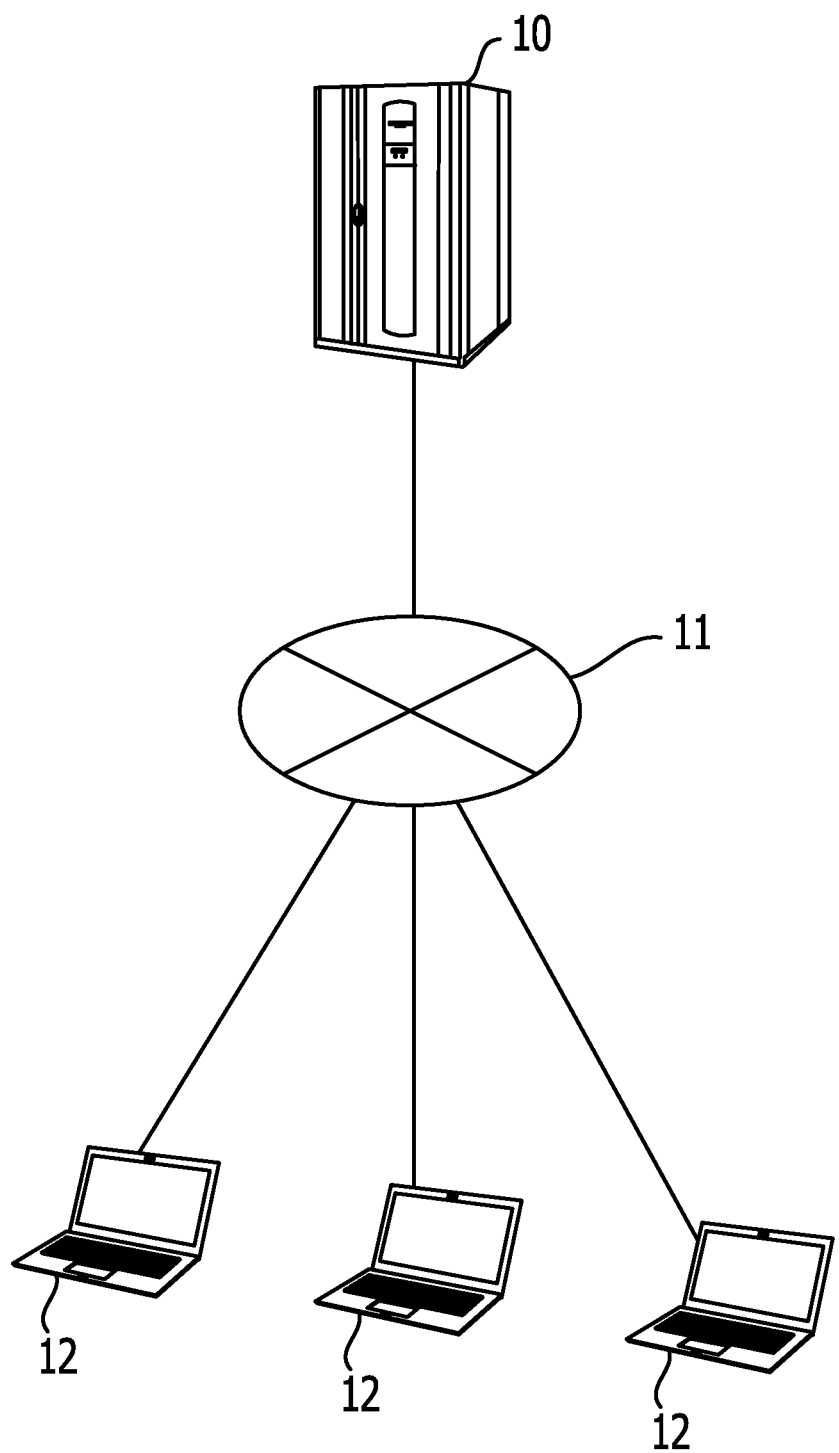
FIG. 2 is an illustration depicting an example of connection between an application server and client terminals in a second embodiment.

Connections between an application server and client terminals of a second embodiment will be described next with reference to FIG. 2. FIG. 2 is an illustration depicting an example of connections between an application server and client terminals in the second embodiment.

An application server 10 is connected through a network 11 to a plurality of client terminals 12. The application server 10 makes a response (service response) to a request (service request) from the client terminal 12, for example.

Figure 3:
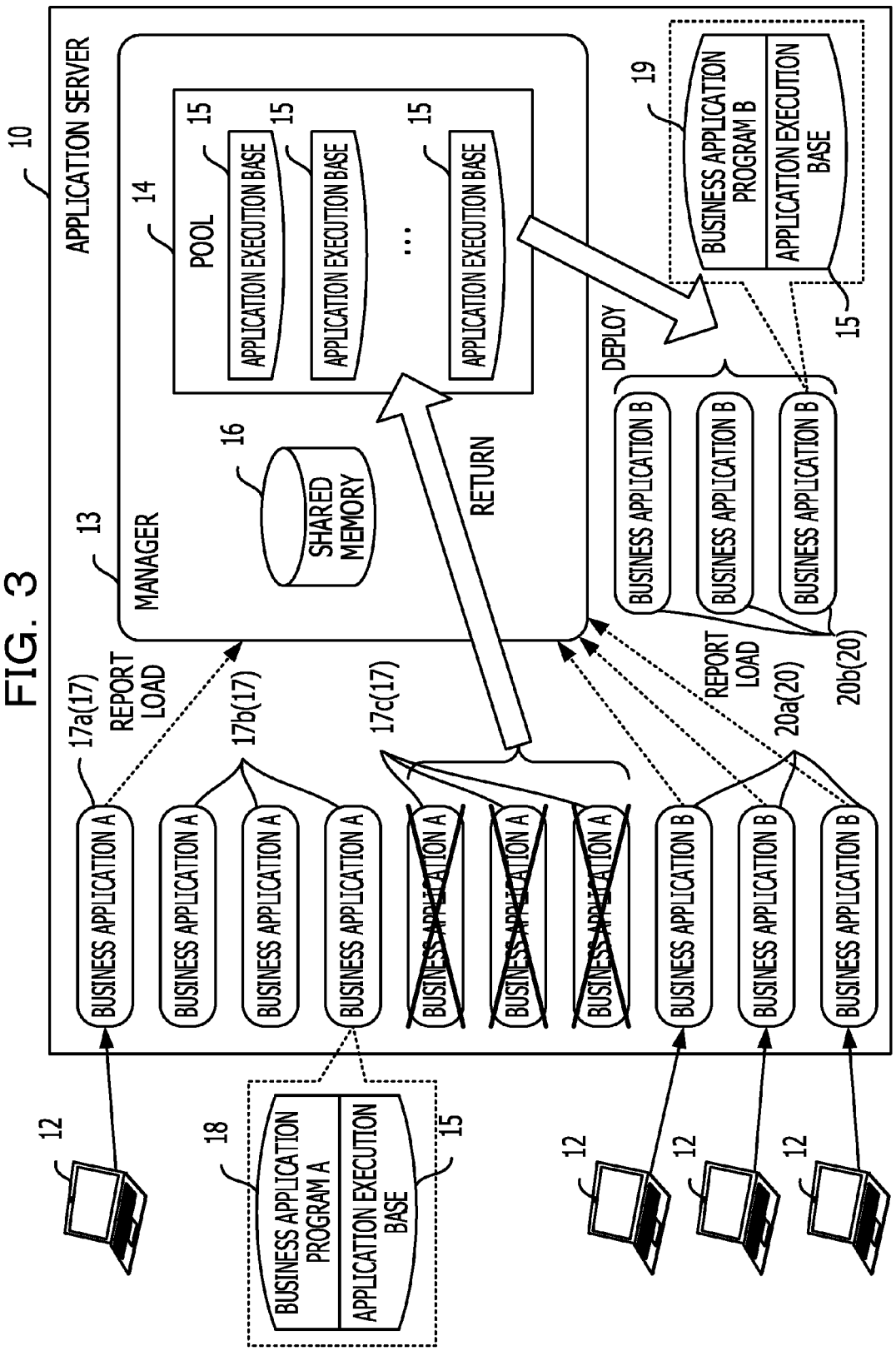
FIG. 3 is an illustration depicting an example of a configuration of the application server in the second embodiment.

The configuration of the application server of the second embodiment will be described next with reference to FIG. 3. FIG. 3 is an illustration depicting an example of the configuration of the application server in the second embodiment.

The application server 10 makes a service response to the service request from the client terminal 12. The application server 10 provides both a service related to a business A and a service related to a business B to the client terminals 12. The service related to the business A is provided by processing performed by a business application A 17. The service related to the business B is provided by processing performed by a business application B 20.

The application server 10 performs processing for service requests from the client terminals 12 by using the business application A 17 and the business application B 20, which each are a unit of processing. The application server 10 concurrently processes service requests from a plurality of client terminals 12. For this reason a plurality of business applications A 17 and a plurality of business applications B 20 are deployed in the application server 10.

Regarding the business application A 17, a business application program A 18 is deployed in a memory corresponding to an application execution base 15, which is a process started in advance. Regarding the business application B 20, a business application program B 19 is deployed in a memory assigned to the application execution base 15.

The application execution base 15 is a process in a started state in which requisite resources have been secured. A given number of application execution bases 15 are started and managed by a manager 13 so as to be pooled in a pool 14 (that is, put into a pool state). The application execution bases 15 construct execution environment bases for business applications (the business application A 17, the business application B 20) using logic (including general-purpose portions such as a framework and library modules) held in the application server 10. The application execution bases 15 are implemented by using a Java (registered trademark) virtual machine (VM), for example.

The business application program (the business application program A 18 or the business application program B 19) is a program unique to a business application deployed in a memory assigned to the application execution base 15.

The application server 10 includes the manager 13 that controls the number of processes for a business application. The manager 13 includes a shared memory 16. The manager 13 starts the application execution bases 15, the number of which corresponds to a maximum number of application execution bases capable of concurrently processing all the business application processes. Then, the manager 13 manages the started application execution bases 15 using the pool 14. The number of application execution bases 15 held by the pool 14 is a variable and used to manage the number of application execution bases 15 for which business application programs are not deployed to the memories.

The manager 13 deploys a business application program in a memory assigned to the application execution base 15, and by doing so deploys a business application. In order to cope with variation in the number of service requests from the client terminals 12 to the application server 10, the manager 13 sets the number of processes for a business application so as to keep leeway for the variation.

Upon accepting a service request from the client terminal 12, a business application makes a load report to the manager 13. The business application makes a load report to the manager 13 by recording, in a given storage area of the shared memory 16, information that indicates that the service request is being processed.

The manager 13 reads information from the given storage area of the shared memory 16, and monitors the loads of the business applications. The manager 13 monitors the loads of the business applications and controls the number of business applications. When detecting that the leeway for the number of business applications is excessively small, the manager 13 deploys a business application program in a memory assigned to the application execution base 15 in the pool state to deploy the business application. Upon detecting that the leeway of the number of business applications is excessively large, the manager 13 undeploys a business application program that has been deployed to a memory assigned to the application execution base 15, thereby undeploying the business application. The manager 13 causes the application execution base 15 from which the business application was undeployed to enter the pool state. The manager 13 may change (deployment and undeployment) business applications by using an application program interface (API).

For example, the manager 13 monitors the loads of the business application A 17 and business application B 20. Among the business applications A 17 the number of which is "7", one business application A 17a is in use, six business applications A 17b and 17c are not in use, and therefore the manager 13 determines according to given criteria that the leeway of the number of business applications A 17 is excessively large. The manager 13 undeploys the business applications A 17c that are not in use, thereby causing the application execution bases 15 from which the business application programs A 18 have been undeployed to enter the pool state.

Among the business applications B 20 the number of which is "3", three business applications B 20a are all in use, and therefore the manager 13 determines according to given criteria that the leeway of the number of business applications B 20 is excessively small. The manager 13 releases three of the application execution bases 15, which have been in the pool state, from the pool state, and deploys the business application program B 19 in a memory assigned to each released application execution base 15, thus deploying a business application B 20b.

Accordingly, the manager 13 may control the number of business applications A 17 and business applications B 20 in an appropriate range. It is possible for the manager 13 to deploy a business application by deploying a business application program to the application execution base 15 which is in the started state, and therefore the cost of deployment may be reduced. It is possible for the manager 13 to undeploy a business application by undeploying a business application program deployed to the application execution base 15 which is in the started state and causing the application execution base 15 to enter the pool state, and therefore the cost of undeployment may be reduced.

Accordingly, since the cost of deployment and undeployment of business applications is reduced, the application server 10 is capable of promptly responding to changes in the loads of business applications. Since a quick changeover of business application programs is possible, the application server 10 is capable of promptly responding to changes in the loads of a plurality of types of business applications.

The application server 10 may quickly control the number of business applications because it is possible for the application server 10 to deploy and undeploy business applications without involving an administrator.

Figure 4:
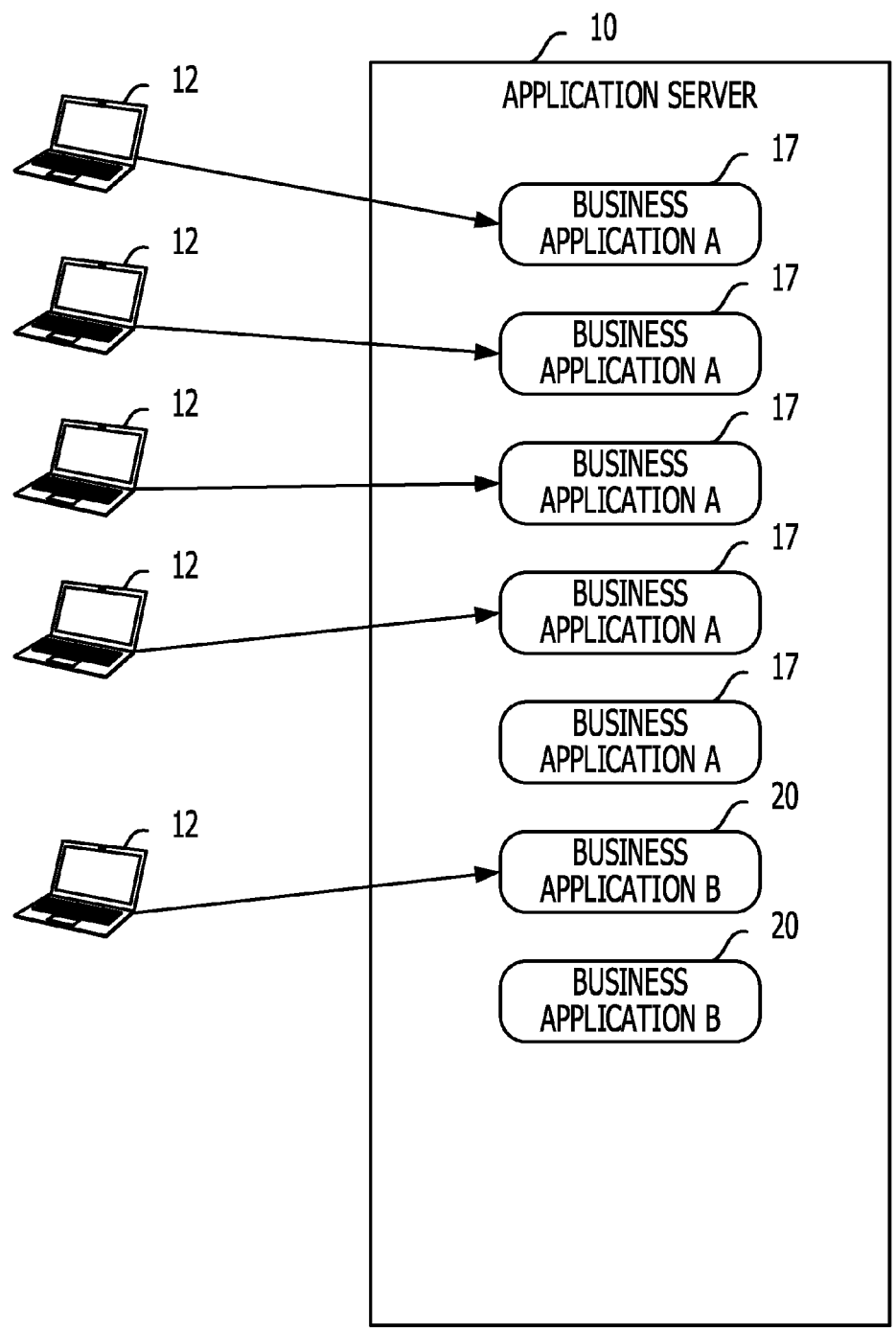
FIG. 4 is an illustration depicting an example of an arrangement before a changeover of business applications in the second embodiment.

A changeover of business applications of the second embodiment will be described next with reference to FIG. 4 and FIG. 5. FIG. 4 is an illustration depicting an example of an arrangement before a changeover of business applications in the second embodiment. The application server 10 includes five business applications A 17 and two business applications B 20. Among the business applications A 17, four are in use (being processing a service request from the client terminal 12), and one is not in use. One of the business applications B 20 is in use, and the other is not in use. Accordingly, in the application server 10, one of the business applications A 17 and one of the business applications B 20 are each able to accept a new service request.

Here, when changes occur in the loads of the business applications A 17 and the business applications B 20, the application server 10 makes a changeover of business applications. For example, when the loads of the business applications A 17 suddenly decrease and the loads of business applications B 20 suddenly increase, the application server 10 makes a changeover of business applications as illustrated in FIG. 5. FIG. 5 is an illustration depicting an example of an arrangement after the changeover of business applications in the second embodiment.

One of the business applications A 17 is in use, and the other is not in use. All five of the business applications B 20 are in use. As such, the application server 10 has decreased the number of the business applications A 17 and increased the number of the business applications B 20, in response to a service request from the client terminal 12.

Figure 5:
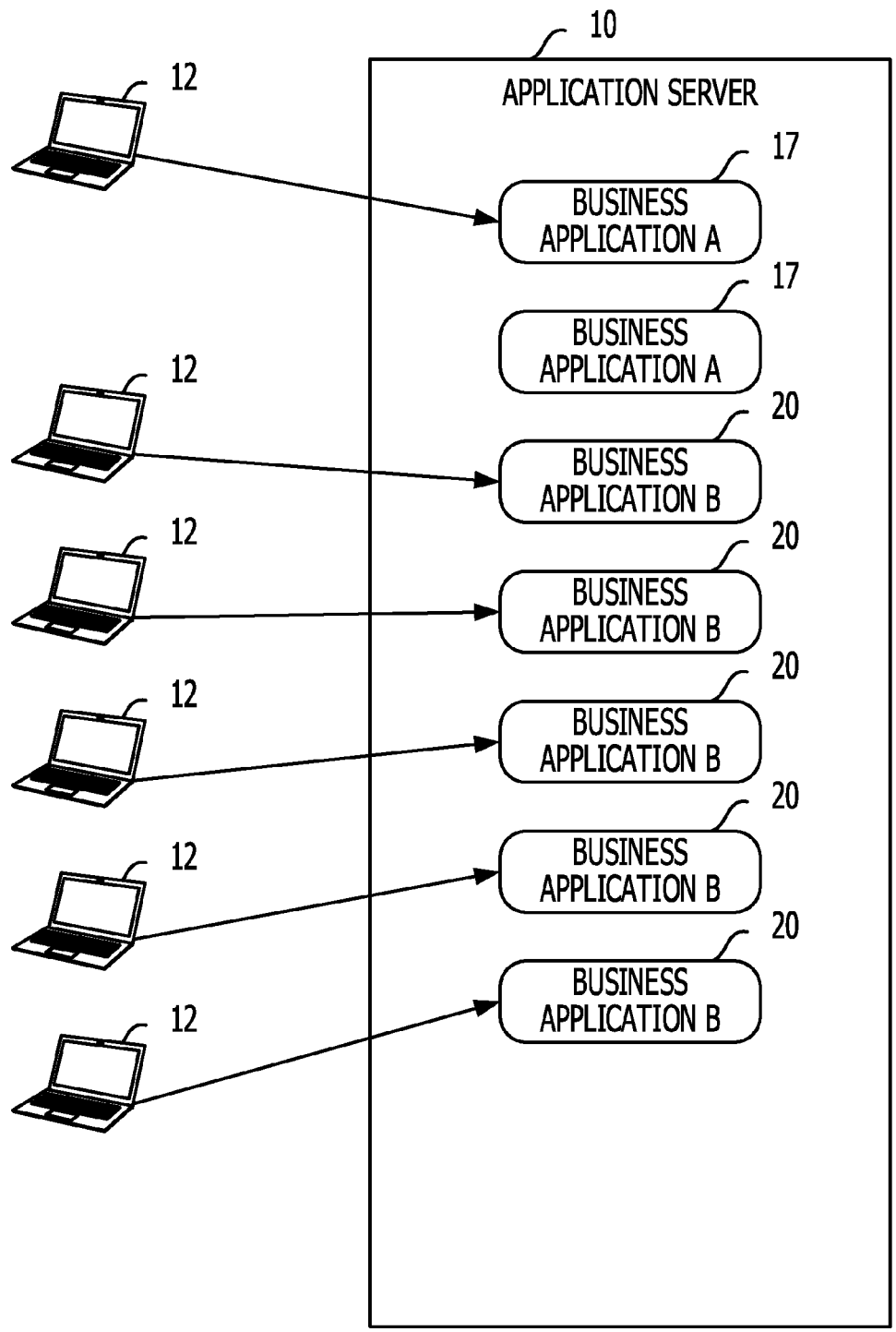
FIG. 5 is an illustration depicting an example of an arrangement after the changeover of business applications in the second embodiment.

FIG. 5 depicts a case with seven application execution bases 15. However, the application server 10 may further increase the number of the business applications B 20 if the application execution base 15 is in the pool state.

When decreasing the number of the business applications A 17 and increasing the number of the business applications B 20, the application server 10 may replace the business application program A 18 with the business application program B 19 while leaving the application execution base 15 in the started state. Accordingly, the application server 10 may reduce both the processing time to start and stop processes and the processing load of a central processing unit (CPU). Thus, the application server 10 may reduce the cost of undeployment of the business applications A 17 and the cost of deployment of the business applications B 20.

Figure 6:
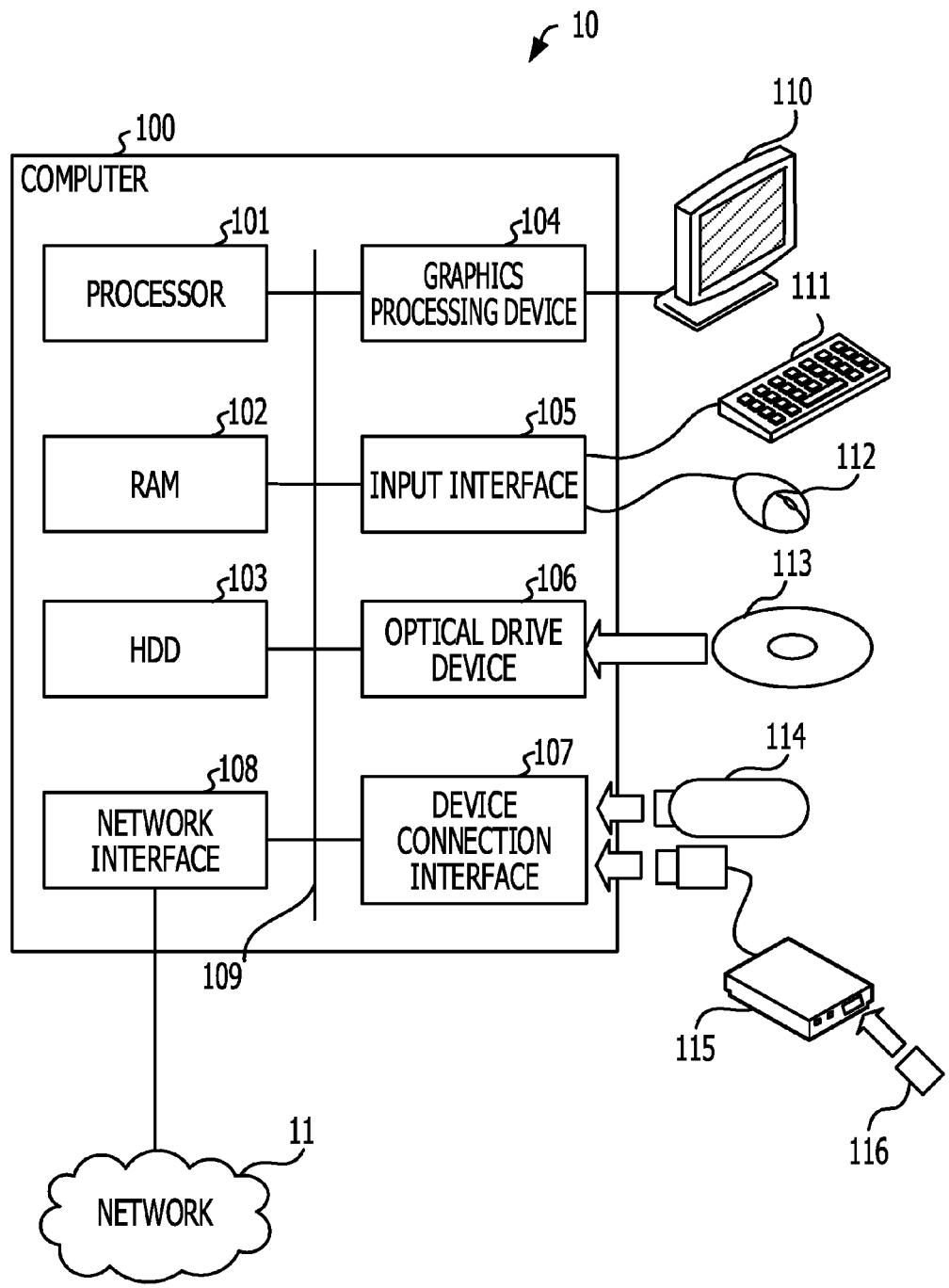
FIG. 6 is a block diagram depicting an example of a hardware configuration of the application server in the second embodiment.

The hardware configuration of the application server 10 of the second embodiment will be described next with reference to FIG. 6. FIG. 6 is a block diagram depicting an example of a hardware configuration of the application server according to the second embodiment. The application server 10 includes a computer 100 and input and output devices (peripheral devices) coupled to the computer 100.

The computer 100 is controlled in the entirety by a processor 101. A random access memory (RAM) 102 and a plurality of peripheral devices are coupled to the processor 101 through a bus 109. The processor 101 is a multiprocessor, for example. The processor 101 is a CPU, a micro processing unit (MPU), a digital signal processor (DSP), an application specific integrated circuit (ASIC), or a programmable logic device (PLD), for example. The processor 101 may be a combination of two or more of a CPU, MPU, DSP, ASIC, and PLD.

The RAM 102 is used as a main memory unit of the computer 100. At least some of the operating system program (OS) and application programs to be executed by the processor 101 are temporarily stored in the RAM 102. Various types of data for processing performed by the processor 101 are stored in the RAM 102.

The peripheral devices coupled to the bus 109 include a hard disk drive (HDD) 103, a graphics processing device 104, an input interface 105, an optical drive device 106, a device connection interface 107, and a network interface 108.

The HDD 103 magnetically writes and reads data from an internal disk. The HDD 103 is used as an auxiliary storage device for the computer 100. The OS program, application programs, and various types of data are stored in the HDD 103. A semiconductor storage device, such as a flash memory, may be used as an auxiliary storage device.

A monitor 110 is coupled to the graphics processing device 104. The graphics processing device 104 causes an image to be displayed on the screen of the monitor 110 in compliance with an instruction from the processor 101. The monitor 110 is a display device that uses a cathode ray tube (CRT) or a liquid crystal display device.

A keyboard 111 and a mouse 112 are coupled to the input interface 105. The input interface 105 transmits signals sent from the keyboard 111 or the mouse 112 to the processor 101. The mouse 112 is an example of a pointing device, and other pointing devices may also be used. Examples of other pointing devices include a touch panel, a tablet, a touchpad, and a trackball.

The optical drive device 106 reads data recorded on an optical disk 113 by using laser light. The optical disk 113 is a portable-type recording medium on which data is recorded in such a way as to enable data to be read by reflection of light. The optical disk 113 is a digital versatile disc (DVD), a DVD-RAM, a compact disc read-only memory (CD-ROM), a CD-recordable (R)/rewritable (RW), or the like.

The device connection interface 107 is a communication interface for connecting a peripheral device to the computer 100. For example, a memory device 114 and a memory reader/writer 115 may be coupled to the device connection interface 107. The memory device 114 is a recording medium being capable of communicating with the device connection interface 107. The memory reader/writer 115 is a device for writing data to a memory card 116 or reading data from the memory card 116. The memory card 116 is a card-type recording medium.

The network interface 108 is coupled to the network 11. The network interface 108 transmits and receives data through the network 11 from other computers or communication devices.

By using a hardware configuration as described above, processing features of the computer 100 of the second embodiment may be implemented. The information processing device 1 illustrated in the first embodiment and the client terminal 12 illustrated in the second embodiment may be implemented by hardware like the computer 100 depicted in FIG. 6.

The computer 100 implements the processing features of the second embodiment by executing programs recorded on a computer-readable recording medium, for example. Programs in which processing contents to be executed by the computer 100 are described may be recorded on various recording media. For example, a program to be executed by the computer 100 may be stored in the HDD 103. The processor 101 loads at least some of the programs in the HDD 103 into the RAM 102, and executes the programs. Programs that are to be executed by the computer 100 may be recorded on portable recording media such as the optical disk 113, the memory device 114, and the memory card 116. The program stored in a portable recording medium becomes executable after the program is installed in the HDD 103 by control from the processor 101. The processor 101 may directly read a program from a portable recording medium and execute the program.

Figure 7:
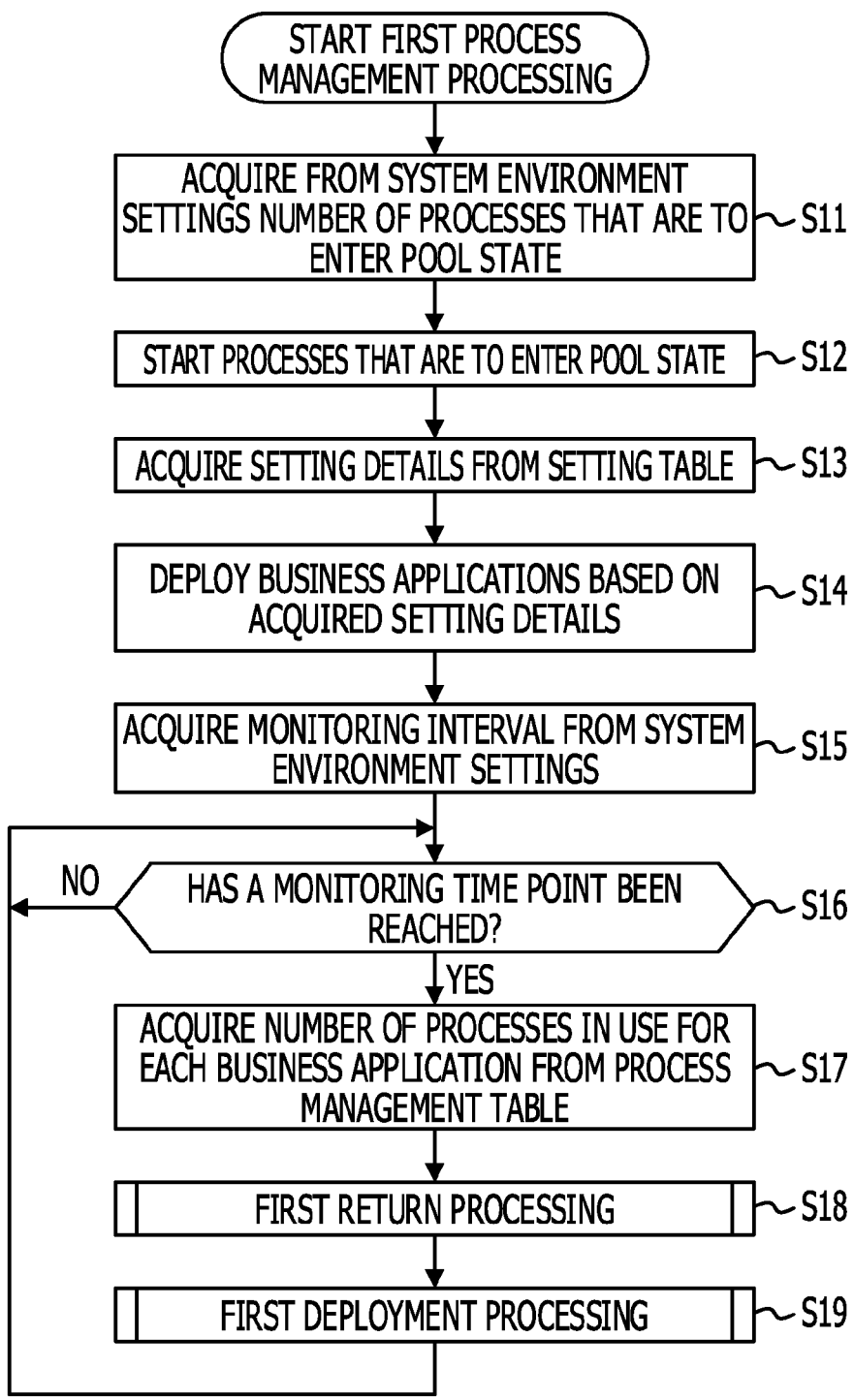
FIG. 7 is a flowchart of first process management processing in the second embodiment.

First process management processing performed by the manager 13 of the second embodiment will be described next with reference to FIG. 7. FIG. 7 is a flowchart of the first process management processing in the second embodiment.

The first process management processing is processing that controls the number of the business applications deployed by the application server 10. The first process management processing is performed from the start of the application server 10.

[S11] The manager 13 acquires the number of application execution bases 15 (the number of processes) that are to enter the pool state, from system environment settings. The system environment settings hold various parameters of system environments set in advance. For example, the number of application execution bases 15 that are to enter the pool state is "10". The number of the application execution bases 15 that are to enter the pool state may be set depending on the processing capability of the application server 10, as well as the processing capability of the system that includes the application server 10, the amount and frequency of service requests that would occur, and so forth.

[S12] The manager 13 starts a number of application execution bases 15 equal to the acquired number. The application execution bases 15 are started by executing a certain application execution base starting program. The application execution base starting program is executed by the application server 10. The manager 13 manages the started application execution bases 15 in the pool state. For example, when having acquired the number of processes "10", the manager 13 starts only ten application execution bases 15 and manages the ten application execution bases 15 in the pool state.

[S13] The manager 13 acquires setting details from a setting table. The setting table will be described with reference to FIG. 8. FIG. 8 is an example of a setting table in the second embodiment. A setting table 50 records setting items for each application (business application) deployed in the application server 10. For example, the setting items of the setting table 50 are a minimum number of processes, a threshold for changes, and the number of processes to be changed. Setting items other than these items may be set. The minimum number of processes is the minimum number of deployments of the business application. The threshold for changes is an upper limit of the number of processes of the business application that are not in use. The number of processes to be changed is a unit number of processes by which the application execution bases 15 in the pool state are deployed or the application execution bases 15 are returned to the pool state.

The application server 10 deploys the business application A and the business application B, and therefore the setting items for the business application A and the business application B are recorded in the setting table 50.

For example, the manager 13 acquires the minimum number of processes "3", the threshold for changes "2", and the number of processes to be changed "2" for the business application A. The manager 13 acquires the minimum number of processes "3", the threshold for changes "2", and the number of processes to be changed "1" for the business application B.

[S14] The manager 13 deploys business applications on the basis of the acquired setting details. In accordance with the setting table 50, the manager 13 deploys the business application program A to three application execution bases 15 that are in the pool state. The manager 13 further deploys the business application program B to three application execution bases 15 that are in the pool state. Accordingly, the manager 13 deploys three business applications A and three business applications B.

[S15] The manager 13 acquires the interval at which the loads of business applications are monitored, from the system environment settings. For example, the interval at which the loads of business applications are monitored is five seconds. The interval at which the loads of business applications are monitored (hereinafter referred to as a "monitoring interval") may be set depending on the processing capability of the application server 10, as well as the processing capability of the system that includes the application server 10, the amount and frequency of service requests that occur, and so forth.

[S16] On the basis of the monitoring interval acquired from the system environment settings, the manager 13 determines a time point at which monitoring is to be made (hereinafter sometimes referred to as a "monitoring time point"). That is, if a monitoring interval of five seconds has been acquired, the manager 13 determines once every five seconds that it is time to perform monitoring. If it has been determined that it is time to perform monitoring, the manager 13 proceeds to S17, whereas if it is determined that it is not time to perform monitoring, the manager 13 waits for a monitoring time point.

Figure 9:
FIG. 9 depicts an example of a process management table in the second embodiment.

[S17] The manager 13 acquires the number of processes in use for each business application from a process management table. Here, the process management table will be described with reference to FIG. 9. FIG. 9 depicts an example of the process management table in the second embodiment.

The usage status of each application execution base 15 is recorded in the process management table 51. The recording items of the process management table 51 are "application" (business application) and "usage flag". However, recording items other than these items may be provided. "Application" is information that is identifiable as a business application assigned to each application execution base 15 (for example, the name such as the business application A or the business application B).

"Usage flag" is a flag used to discriminate between usage statuses of the application execution base 15 to which an application is assigned. The usage flag "1" indicates that the application execution base 15 to which an application is assigned is in use, that is, currently executing processing for a service request upon acceptance of the service request from the client terminal 12. The usage flag "0" indicates that the application execution base 15 to which an application is assigned is not in use, that is, is in a state in which the application execution base 15 has not accepted a service request from the client terminal 12.

For example, in accordance with the process management table 51, seven processes to which the business application A is assigned are listed, and three of the processes are in use. From this, for the business application A, the manager 13 acquires the number of processes in use "3" and the number of processes not in use "4". In accordance with the process management table 51, three processes to which the business application B is assigned are listed, and three of the processes are in use. From this, for the business application B, the manager 13 acquires the number of processes in use "3" and the number of processes not in use "0".

The process ID is identifying information used to uniquely identify the application execution bases 15 managed by the manager 13. This allows the manager 13 to distinguish a plurality of application execution bases 15 from one another and grasp the usage status of each of the application execution bases 15.

The process management table 51 is held in the shared memory 16. The shared memory 16 is set on the RAM 102 or the HDD 103, for example. The shared memory 16 is accessible to the business application A and the business application B in addition to the manager 13. The business application A or the business application B accepts a service request from the client terminal sets the corresponding usage flag to "1", and makes a service response. Then, the business application A or the business application B prepares to accept the next service request, and sets the corresponding usage flag to "0".

[S18] The manager 13 performs first return processing. As occasion arises for each business application, the manager 13 returns the application execution bases 15 on the basis of the setting details acquired in S13 and the number of processes in use acquired in S17. Details for the first return processing will be described later with reference to FIG. 10.

[S19] The manager 13 performs first deployment processing. As occasion arises for each business application, the manager 13 deploys the business application on the basis of the setting details acquired in S13 and the number of processes in use acquired in S17. After the first deployment processing, the manager 13 proceeds to S16. Details concerning the first deployment processing will be described later with reference to FIG. 11.

Although it has been described that the shared memory 16 is accessible to the business application A and the business application B, the shared memory 16 may be a memory for exclusive use by the manager 13. In this case, the business application A and the business application B notify the manager 13 of the status of acceptance of a service request from the client terminal 12. The manager 13 may be designed to update the process management table 51 on the basis of a notification from the business application A or the business application B.

Figure 10:
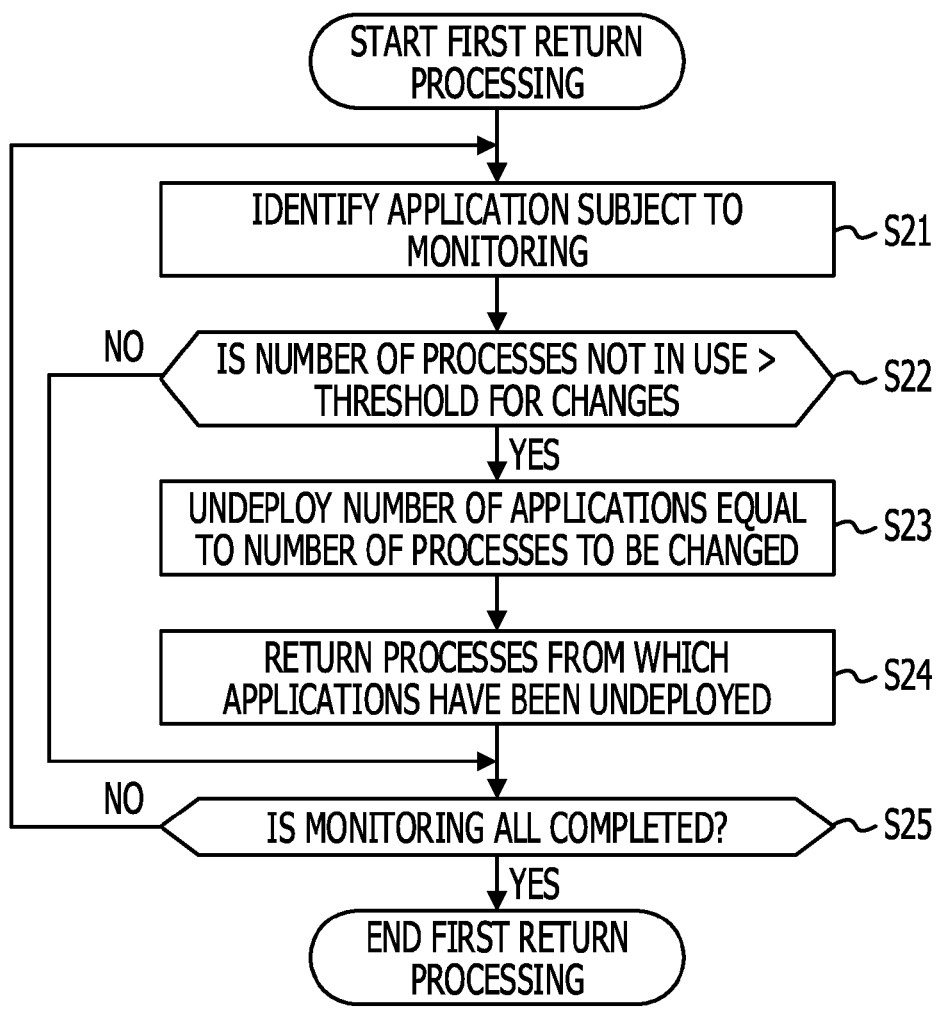
FIG. 10 is a flowchart of first return processing in the second embodiment.

The first return processing performed by the manager 13 of the second embodiment will be described next with reference to FIG. 10. FIG. 10 is a flowchart of the first return processing in the second embodiment.

The first return processing is processing that returns the application execution bases 15 as occasion arises for each business application. The first return processing is performed in S18 of the first process management processing.

[S21] The manager 13 identifies one business application to be monitored (that is, an application that is a monitoring target) from the setting table 50. For example, the manager 13 identifies either of the business application A and the business application B, which are set in the setting table 50, as a monitoring target.

[S22] The manager 13 compares the number of processes not in use with the threshold for changes for the business application identified as the monitoring target to determine whether the number of processes not in use is larger than the threshold for changes. The manager 13 proceeds to S23 if the number of processes not in use is larger than the threshold for changes, whereas the manager 13 proceeds to S25 if the number of processes not in use is not larger than the threshold for changes. That is, if the number of processes not in use is excessively large, the manager 13 proceeds to processing that returns the application execution bases 15.

[S23] The manager 13 undeploys a number of business applications equal to the number of processes to be changed.

[S24] The manager 13 moves the application execution bases 15 from which the business applications have been undeployed so that these application execution bases 15 enter (return to) the pool state. The manager 13 erases the records of deployments of the applications in the process management table 51 for the application execution bases 15 from which the business applications have been undeployed.

[S25] The manager 13 determines whether all the business applications to be monitored have been monitored. The manager 13 proceeds to S21 if all the business applications to be monitored have not been monitored, whereas the manager 13 ends the first return processing if all the business applications to be monitored have been monitored.

Thus, when the business applications are in the usage statuses as in the process management table 51, the application server 10 operates as follows. For the business application A, the number of processes not in use "4" is larger than the threshold for changes "2". The manager 13 therefore returns two application execution bases 15 the number of which is the number of processes to be changed. In contrast, regarding the business application B, the number of processes not in use "0" is not larger than the threshold for changes "2". The manager 13 therefore does not return the application execution base 15.

In this way, the application server 10 may manage all the business applications to be monitored such that the number of processes not in use is not excessively large. It is possible for the application server 10 to undeploy processes not in use by returning the application execution bases 15 rather than by actually stopping processes not in use. Accordingly, the cost of stopping the application execution bases 15 may be reduced.

Figure 11:
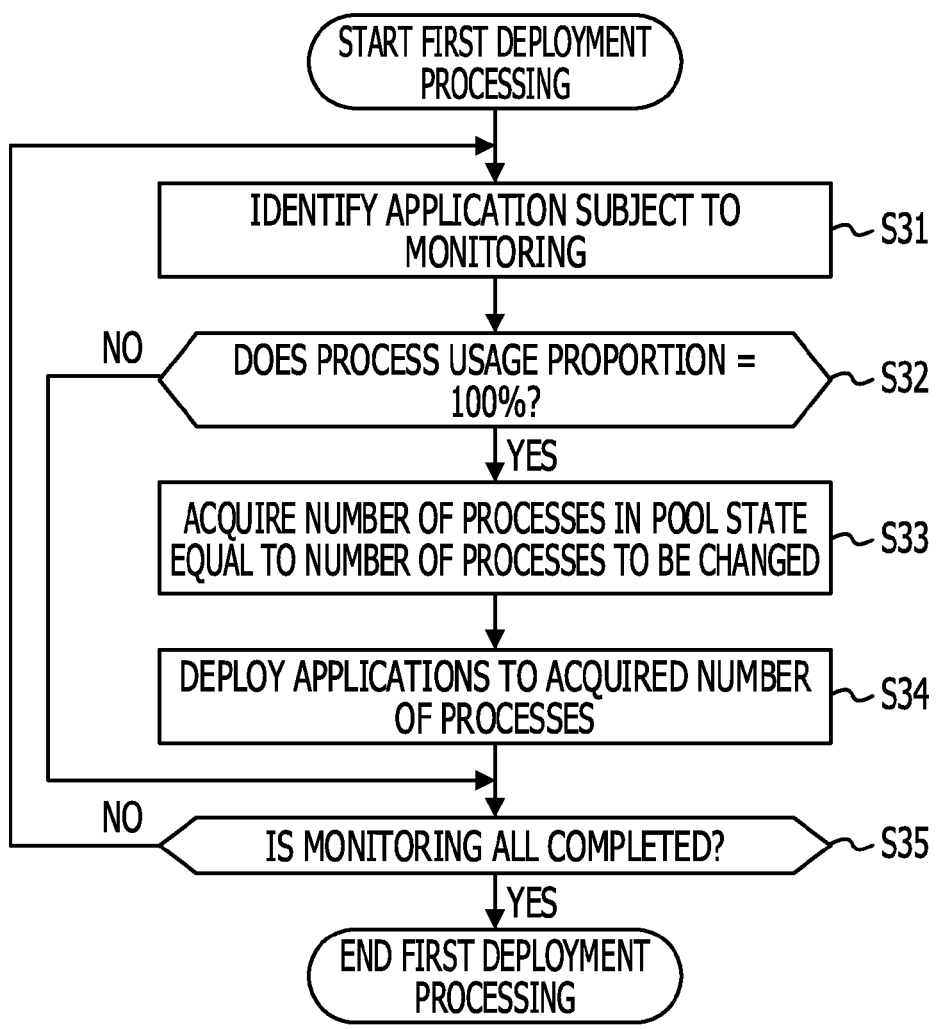
FIG. 11 is a flowchart of first deployment processing in the second embodiment.

The first deployment processing performed by the manager 13 of the second embodiment will be described next with reference to FIG. 11. FIG. 11 is a flowchart of the first deployment processing in the second embodiment.

The first deployment processing is processing of deploying each business application to the application execution base 15 in the pool state as occasion arises for the business application. The first deployment processing is performed in S19 of the first process management processing.

[S31] The manager 13 identifies one business application to be monitored from the setting table 50. For example, the manager 13 identifies either of the business application A and the business application B, which are set in the setting table 50, as a monitoring target.

[S32] Regarding the business application identified as the monitoring target, the manager 13 determines whether the process usage is 100%, that is, whether the number of processes not in use is "0". For the business application identified as the monitoring target, if the number of processes not in use is "0", the manager 13 proceeds to S33. If the number of processes not in use is not "0", the manager 13 proceeds to S35. That is, if the number of processes not in use is excessively small, the manager 13 proceeds to processing to deploy a business application.

[S33] The manager 13 sets as business application deployment targets a number of application execution bases 15 in the pool state equal to the number of processes to be changed.

[S34] The manager 13 assigns and deploys the business application to each of the set application execution bases 15 in the pool state. For each of the application execution bases 15 to which the business application has been assigned, the manager 13 records the assigned business application in the process management table 51.

[S35] The manager 13 determines whether all the business applications to be monitored have been monitored. The manager 13 proceeds to S31 if all the business applications to be monitored have not been monitored, whereas the manager 13 ends the first deployment processing if all the business applications to be monitored have been monitored.

Thus, when the business applications are in the usage statuses as in the process management table 51, the application server 10 operates as follows. For the business application A, the number of processes not in use is "4", not "0". The manager 13 therefore does not deploy the business application A. In such usage statuses of the business applications as in the process management table 51, even after the first return processing has been performed, the number of processes not in use is "2", not "0", for the business application A. The manager 13 therefore does not perform deployment to the application execution bases 15. In contrast, for the business application B, the number of processes not in use is "0". The manager 13 therefore deploys the business application B so that the number of deployments is equal to the number of processes to be changed "2".

It has been described that the manager 13 determines in step S32 whether the process usage is 100%. However, using a threshold set in advance, the manager 13 may determine the extent to which the number of processes not in use is excessively small.

In this way, the application server 10 may manage all the business applications to be monitored so that the number of processes not in use is not excessively small. It is possible for the application server 10 to deploy the business applications by deploying application programs to memories assigned to the application execution bases 15 in the pool state rather than by starting a process from scratch. For this reason, the cost of deployment may be reduced.

The application server 10 as such may change the number of processes for each business application at a high speed depending on a change in the load status that is difficult to estimate, such as the occurrence of an unexpected situation. The reduced cost related to a change in the number of processes for each business application enables the monitoring intervals to be decreased. This is one of reasons why it is possible to change the number of processes at a high speed.

The application server 10 as such may make it unnecessary for a system administrator to set a target response time for each business application, and thus may reduce the loads on the system administrator.

The application server 10 as such determines whether to change the number of processes, using more accurate usage statuses of processes. For this reason, services that have a short processing delay and are stable may be provided to the client terminals 12.

The application server 10 as such may avoid needless resources by setting the number of processes in accordance with the peak of loads.

The application server 10 may tune the setting details of the setting table 50 for every business application. Accordingly, the number of processes may be suitably controlled in accordance with the characteristics of business applications.

Criteria for determining that the number of processes not in use is excessively large and the criteria for determining that the number processes not in use is excessively small may be set for each business application. The monitoring time set as a system environment setting may be included in the setting details of the setting table 50, or the monitoring time may differ for each business application.

Third Embodiment

Figure 12:
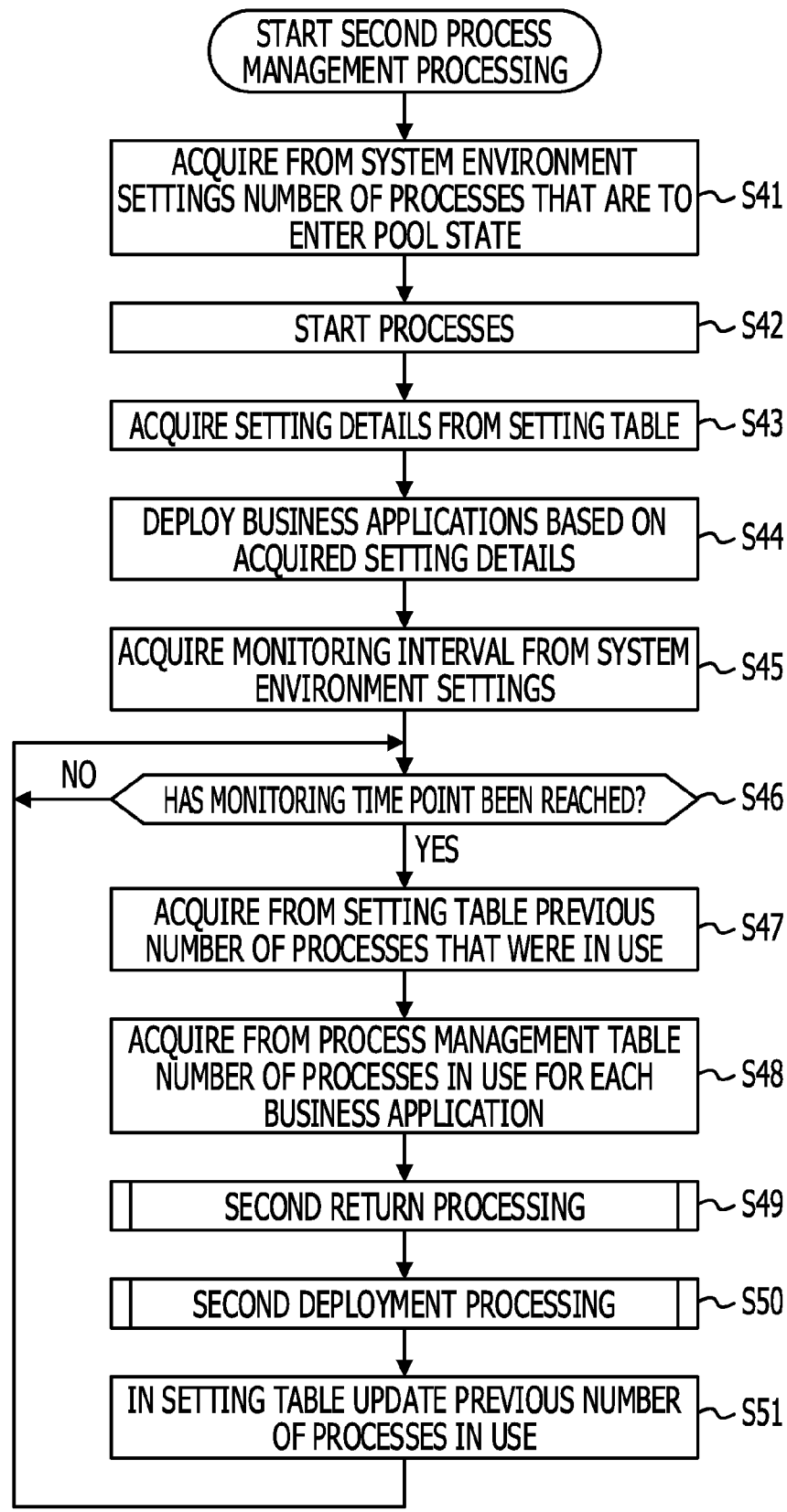
FIG. 12 is a flowchart of second process management processing in a third embodiment.

Second process management processing performed by the manager 13 of a third embodiment will be described next with reference to FIG. 12. FIG. 12 is a flowchart of the second process management processing in the third embodiment.

The second process management processing is processing that controls the number of the business applications deployed by the application server 10. The second process management processing is performed from the start of the application server 10. The second process management processing differs from the first process management processing in that changes over time for the number of processes in use are monitored.

[S41] The manager 13 acquires the number of application execution bases 15 (the number of processes) that are to enter the pool state, from system environment settings.

[S42] The manager 13 starts a number of application execution bases 15 the number of which is equal to the number of acquired processes. The manager 13 manages the started application execution bases 15 in the pool state.

[S43] The manager 13 acquires setting details from a setting table. Here, the setting table will be described with reference to FIG. 13. FIG. 13 is an example of a setting table of the third embodiment. A setting table 52 records setting items for each application (business application) deployed in the application server 10. For example, the setting items of the setting table 52 are a minimum number of processes, a threshold for changes, and the previous number of processes in use. Setting items other than these items may be set. The minimum number of processes is the minimum number of deployments of the business application. The threshold for changes is an upper limit for the number of processes of the business application that are not in use. The previous number of processes in use is the number of processes in use for each application observed at the previous monitoring time point.

The application server 10 is provided with the business application A and the business application B. Therefore, the setting items for the business application A and the business application B are recorded in the setting table 52.

For example, the manager 13 acquires the minimum number of processes "3", the threshold for changes "2", and the previous number of processes in use "6", for the business application A. The manager 13 acquires the minimum number of processes "3", the threshold for changes "2", and the previous number of processes in use "1", for the business application B.

[S44] The manager 13 deploys business applications on the basis of the acquired setting details. In accordance with the setting table 52, the manager 13 deploys the business application programs A to three application execution bases 15 in the pool state. The manager 13 further deploys the business application programs B to three application execution bases 15 in the pool state. Accordingly, the manager 13 deploys three business applications A and three business applications B.

[S45] The manager 13 acquires from the system environment settings the interval at which the loads of business applications are monitored. For example, the interval at which the loads of business applications are monitored is five seconds.

[S46] On the basis of the monitoring interval acquired from the system environment settings, the manager 13 determines a monitoring time point. That is, when a monitoring interval of five seconds has been acquired, the manager 13 determines once every five seconds that it is time to perform monitoring. If it is determined that it is time to perform monitoring, the manager 13 proceeds to S47, whereas if it is determined that it is not time to perform monitoring, the manager 13 waits for a monitoring time point.

[S47] The manager 13 acquires the previous number of processes in use from the setting table 52.

[S48] The manager 13 acquires the number of processes in use for each business application from a process management table. The process management table of the third embodiment is similar to the process management table of the second embodiment. For this reason, description will be given with reference to the process management table 51 depicted in FIG. 9.

For example, in accordance with the process management table 51, seven processes to which the business application A is assigned are listed, and three of the processes are in use. Therefore, for the business application A, the manager 13 acquires the number of processes in use "3" and the number of processes not in use "4". In accordance with the process management table 51, three processes to which the business application B is assigned are listed, and three of the processes are in use. From this, regarding the business application B, the manager 13 acquires the number of processes in use "3" and the number of processes not in use "0".

[S49] The manager 13 performs second return processing. As occasion arises for each business application, the manager 13 returns the application execution bases 15 on the basis of the setting details acquired in S43, the previous number of processes in use acquired in S47, and the number of processes in use acquired in S48. Details concerning the second return processing will be described later with reference to FIG. 14.

[S50] The manager 13 performs second deployment processing. The manager 13 deploys the business applications on the basis of the setting details acquired in S43, the previous number of processes in use acquired in S47, and the number of processes in use acquired in S48. As occasion arises for each business application, the manager 13 deploys the business application. Details concerning the second deployment processing will be described later with reference to FIG. 15.

[S51] The manager 13 replaces the previous number of processes in use of the setting table 52 with the current number of processes in use. After the update of the previous number of processes in use of the setting table 52, the manager 13 proceeds to S46.

Although it has been described that the shared memory 16 is accessible by the business application A and the business application B, the shared memory 16 may be a memory used exclusively by the manager 13. In this case, the business application A and the business application B notify the manager 13 of the status of acceptance of a service request from the client terminal 12. The manager 13 may be designed to update the process management table 51 on the basis of a notification from the business application A or the business application B.

Figure 14:
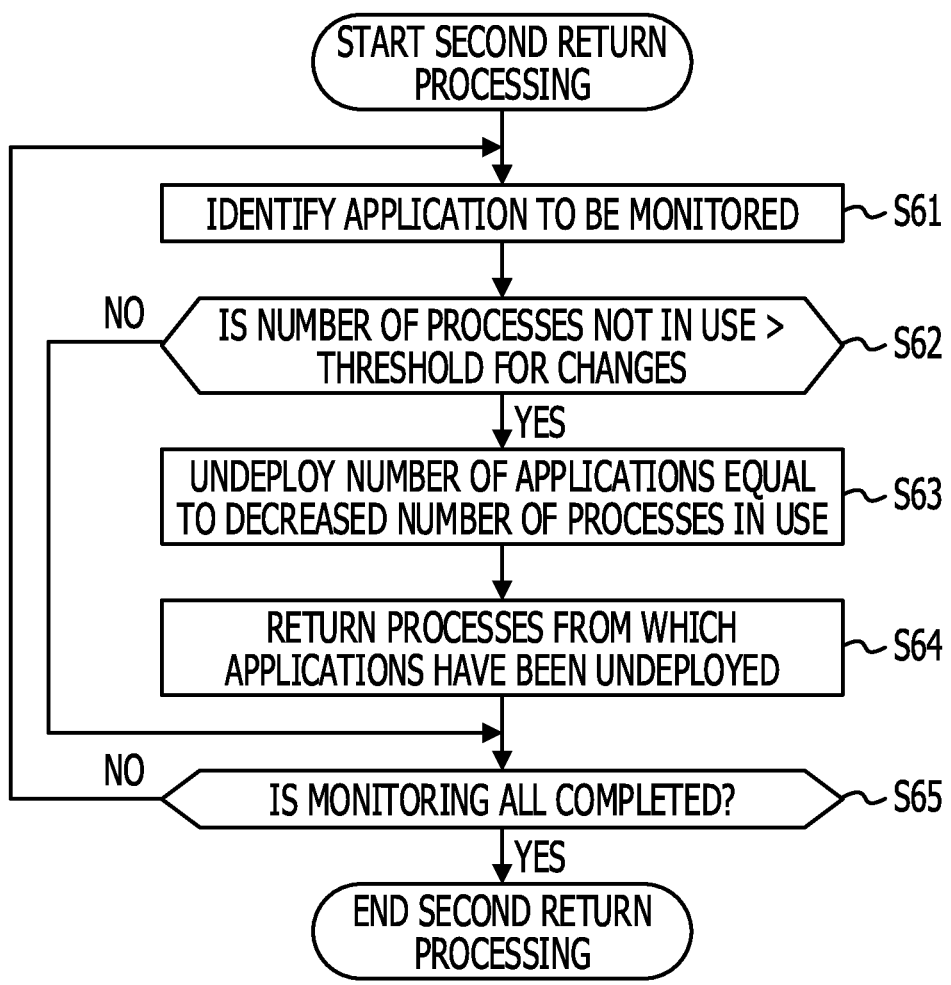
FIG. 14 is a flowchart of second return processing in the third embodiment.

The second return processing performed by the manager 13 of the third embodiment will be described next with reference to FIG. 14. FIG. 14 is a flowchart of the second return processing in the third embodiment.

The second return processing is processing that returns the application execution bases 15 as occasion arises for each business application. The second return processing is performed in S49 of the second process management processing.

[S61] From the setting table 52 the manager 13 identifies one business application as a monitoring target. For example, the manager 13 identifies either of the business application A and the business application B, which are set in the setting table 52, as a monitoring target.

[S62] The manager 13 compares the number of processes not in use with the threshold for changes for the business application identified as the monitoring target to determine whether the number of processes not in use is larger than the threshold for changes. If the number of processes not in use is larger than the threshold for changes, the manager 13 proceeds to S63. Otherwise, if the number of processes not in use is not larger than the threshold for changes, the manager 13 proceeds to S65. That is, if the number of processes not in use is excessively large, the manager 13 proceeds to processing that returns the application execution bases 15.

[S63] The manager 13 undeploys a number of business applications equal to the number obtained by subtracting the current number of processes in use from the previous number of processes in use.

[S64] The manager 13 returns the application execution bases 15 from which the business applications have been undeployed. The manager 13 erases the records of deployments of the applications in the process management table 51 for the application execution bases 15 from which the business applications have been undeployed.

[S65] The manager 13 determines whether all the business applications to be monitored have been monitored. If all the business applications to be monitored have not been monitored, the manager 13 proceeds to S61. Otherwise, if all the business applications to be monitored have been monitored, the manager 13 ends the second return processing.

Thus, when the business applications are in the usage statuses as in the process management table 51, the application server 10 operates as follows. For the business application A, the number of processes not in use "4" is larger than the threshold for changes "2". The manager 13 therefore returns two application execution bases 15, which is the difference between the previous number of processes in use "6" and the current number of processes in use "4". In contrast, for the business application B, the number of processes not in use "0" is not larger than the threshold for changes "2". The manager 13 therefore does not return the application execution base 15.

Accordingly, the application server 10 may manage all the business applications to be monitored such that the number of processes not in use is not excessively large. It is possible for the application server 10 to undeploy processes not in use by returning the application execution bases 15 rather than by actually stopping the processes not in use. Therefore, the cost of returning may be reduced.

The second deployment processing performed by the manager 13 of the third embodiment will be described next with reference to FIG. 15. FIG. 15 is a flowchart of the second deployment processing in the third embodiment.

The second deployment processing is processing to deploy each business application to the application execution base 15 in the pool state as occasion arises for the business application. The second deployment processing is performed in S50 of the second process management processing.

[S71] The manager 13 identifies one business application to be monitored from the setting table 52. For example, the manager 13 identifies either of the business application A and the business application B, which are set in the setting table 52, as a monitoring target.

[S72] For the business application identified as the monitoring target, the manager 13 determines whether the process usage is 100%, that is, whether the number of processes not in use is "0". Regarding the business application identified as the monitoring target, if the number of processes not in use is "0", the manager 13 proceeds to S73. If the number of processes not in use is not "0", the manager 13 proceeds to S75. That is, if the number of processes not in use is excessively small, the manager 13 proceeds to processing to deploy a business application.

[S73] The manager 13 determines the current number of application execution bases 15 in the pool state to which the business application is to be deployed by adding an increase number to the previous number of processes in use.

[S74] The manager 13 assigns and deploys the business application to each of the determined application execution bases 15 in the pool state. For each of the application execution bases 15 to which the business application has been assigned, the manager 13 records the assigned business application in the process management table 51.

[S75] The manager 13 determines whether all the business applications to be monitored have been monitored. If all the business applications to be monitored have not been monitored, the manager 13 proceeds to S71. Otherwise, if all the business applications to be monitored have been monitored, the manager 13 ends the second deployment processing.

Thus, when the business applications are in the usage statuses as in the process management table 51, the application server 10 operates as follows. For the business application A, the number of processes not in use is "4", not "0". The manager 13 therefore does not deploy the business application A. With business applications that have usage statuses as in the process management table 51, even after the second return processing has been performed, the number of processes not in use for the business application A is "1", not "0". The manager 13 therefore does not perform deployment to the application execution bases 15. In contrast, for the business application B, the number of processes not in use is "0", and therefore the manager 13 deploys the business application B. The manager 13 deploys the business application B so that the number of deployments is increased by two from the previous number of processes in use "1" to the current number of processes in use "3".

It has been described that the manager 13 determines in S72 whether the process usage is 100%. However, using a threshold set in advance, the manager 13 may determine the extent to which the number of processes not in use is excessively small.

Accordingly, the application server 10 may manage all the business applications to be monitored so that the number of processes not in use is not excessively small. It is possible for the application server 10 to deploy the business applications by deploying application programs to memories assigned to the application execution bases 15 in the pool state rather than by starting a process from scratch. For this reason, the cost of deployment may be reduced.

The application server 10 as such may change the number of processes for each business application at a high speed depending on a change in the load status that is difficult to estimate, such as the occurrence of an unexpected situation. The reduced cost related to a change in the number of processes for each business application enables the monitoring intervals to be decreased. This is one of reasons why it is possible to change the number of processes at a high speed.

The application server 10 as such may makes it unnecessary for a system administrator to set a target response time for each business (business application), and thus may reduce the loads on the system administrator.

The application server 10 as such determines whether to change the number of processes, using the usage statuses of processes that are more accurate than before. For this reason, services that have a short processing delay and are stable may be provided to the client terminals 12.

The application server 10 as such may avoid wasting resources by setting the number of processes in accordance with the peak load.

The application server 10 may change the amount of variation in the number of processes depending on the process usage or the amount of variation in the number of processes in use. Accordingly, if the process usage or the amount of variation in the number of processes in use is small, the application server 10 may reduce the cost of controlling the number of processes. If the process usage or the amount of variation in the number of processes in use is large, the application server 10 may control the number of processes so as to keep up with a large variation.

Both the criteria for determining whether the number of processes not in use is excessively large and the criteria for determining whether the number processes not in use is excessively small may be set for each business application. The monitoring time set as a system environment setting may be included in the setting details of the setting table 50, and the monitoring times may differ for each business application.

Although two business applications, the business application A and the business application B, have been mentioned as exemplary business applications in the second embodiment and in the third embodiment, application execution bases may be shared by three or more types of business applications. Although an example where all the business applications share one type of application execution bases have been illustrated, each group of a plurality of types of business applications may share corresponding application execution bases. For example, the business application A and the business application B may share the business execution base C, and the business application D and the business application E may share the application execution base F.

The above processing functions may be realized by a computer. In such a case, a program that describes processing contents of functions that the information processing device 1 and the application server 10 are desired to have is provided. By executing the program using a computer, the above processing functions are implemented by the computer. The program that describes processing contents may be recorded on a computer-readable recording medium. Examples of the computer-readable recording medium include a magnetic storage device, an optical disk, a magneto-optical recording medium, and a semiconductor memory. Examples of the magnetic storage device include a hard disk drive (HDD), a flexible disk (FD), and a magnetic tape. Examples of the optical disk include a DVD, DVD-RAM, and CD-ROM/RW. Examples of the magneto-optical recording medium include magneto-optical disk (MO).

When a program is put into circulation, a portable recording medium, such as a DVD or a CD-ROM, on which the program is recorded is sold. A program may be stored in a storage device of a server computer, and the program may be transferred from the server computer through a network to other computers.

A computer that executes a program stores a program recorded on a portable recording medium or a program transferred from a server computer in a storage device of the computer. Then, the computer reads the program from its storage device and executes processing in accordance with the program. The computer may read a program directly from a portable recording medium and execute processing in accordance with the program. The computer may execute processing in accordance with the program one by one each time the program is transferred from a server computer coupled through a network.

At least some of the above processing features may be implemented by an electronic circuit, such as a DSP, ASIC, or PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program causing a computer to execute a process, the process comprising:
  starting N (two or more) processes from a first program; and
  controlling variation in a number of processes for which a second program is deployed, depending on a load on the processes for which the second program is deployed, within a range of the N processes by deploying the second program to a storage area corresponding to one process of the N processes and undeploying the second program deployed to the storage area.

2. The storage medium according to claim 1, wherein
the starting of the N processes includes starting a set number of processes, and the set number is set in advance.

3. The storage medium according to claim 2, wherein
the controlling of variation in the number of processes includes controlling variation in the number of processes for which the second program is deployed in such a way that the number of processes is increased or decreased by a variation number set in advance.

4. The storage medium according to claim 2, the process further comprising
monitoring the number of the processes for which the second program is deployed, at given time points, wherein
the controlling of a change in the number of processes includes
controlling variation in the number of processes so that the number of processes is increased or decreased by a variation number determined based on a difference between a first result of monitoring the number of processes and a second result of monitoring at a monitoring time point previous to the monitoring of the first result.

5. The storage medium according to claim 3, wherein
there are a plurality of types of the second programs, and the variation number is set for each type of the second program.

6. The storage medium according to claim 1, the process further comprising
monitoring the load at given time points, wherein
the controlling of a change in the number of processes includes
controlling variation in the number of processes so that the number of processes is increased or decreased by the variation number determined based on a comparison between a first result of monitoring the load and a second result of monitoring at a monitoring time point previous to monitoring of the first result.

7. The storage medium according to claim 1, the process further comprising
monitoring the load at a given cycle, wherein
the controlling of variation in the number of processes includes controlling variation in the number of processes at the given cycle.

8. The storage medium according to claim 1, wherein
the N processes are execution bases shared by a plurality of types of programs for supporting different services.

9. The storage medium according to claim 1, wherein
the starting of N processes includes starting the N processes before receiving a service request from a client terminal.

10. The storage medium according to claim 1, the process further comprising
detecting the load based on the number or proportion of the processes during execution of processing related to a service request among the N processes.

11. An information processing method performed by a computer, comprising:
  starting N (two or more) processes from a first program; and controlling variation in a number of processes for which a second program is deployed, depending on a load on the processes for which the second program is deployed, within a range of the N processes by deploying the second program to a storage area corresponding to one process of the N processes and undeploying the second program deployed to the storage area.

12. An information processing device, comprising:

a memory; and a processor coupled to the memory and configured to:

start N (two or more) processes from a first program, and
control a change in a number of processes for which a second program is deployed, depending on a load on the processes for which the second program is deployed, within a range of the N processes by deploying the second program to a storage area corresponding to one process of the N processes and undeploying the second program deployed to the storage area.

* * * * *